(12) United States Patent
Fried (10) Patent No.: US 8,741,054 B2
(45) Date of Patent: Jun. 3, 2014

(54) PRODUCTION OF CEMENT ADDITIVES FROM COMBUSTION PRODUCTS OF HYDROCARBON FUELS AND STRENGTH ENHANCING METAL OXIDES

(75) Inventor: Wayne Fried, Maspeth, NY (US)

(73) Assignee: Ash Improvement Technology, Inc., Maspeth, NY (US)

( * ) Notice: Subject to any disclaimer, the term of this patent is extended or adjusted under 35 U.S.C. 154(b) by 52 days.

(21) Appl. No.: 12/889,100

(22) Filed: Sep. 23, 2010

(65) Prior Publication Data

US 2011/0067601 A1     Mar. 24, 2011

Related U.S. Application Data

(60) Provisional application No. 61/245,594, filed on Sep. 24, 2009.

(51) Int. Cl.
*C04B 18/04*     (2006.01)
*C04B 18/08*     (2006.01)
*C04B 14/10*     (2006.01)

(52) U.S. Cl.
USPC .......... 106/705; 106/714; 106/716; 106/718; 106/737; 106/738; 106/DIG. 1

(58) Field of Classification Search
CPC .......... C04B 18/04; C04B 18/08; C04B 14/10
USPC ......... 106/745, 705, 714, 716, 718, 737, 738, 106/DIG. 1
See application file for complete search history.

(56) References Cited

U.S. PATENT DOCUMENTS

| 3,437,329 A | 4/1969 | Ostberg et al. |
| 3,909,283 A | 9/1975 | Warnke |
| 4,026,717 A * | 5/1977 | Harris et al. .................. 106/743 |

(Continued)

FOREIGN PATENT DOCUMENTS

| DE | 42 10 224 | 5/1993 |
| EP | 0 022 318 | 1/1981 |

(Continued)

OTHER PUBLICATIONS

Y.H. Khraisha, D.R. Dugwell, "Coal Combustion and Limestone Calcination in a Suspension Reactor", Chem. Eng. Science, vol. 47, No. 5, 1992, pp. 993-1006.

(Continued)

*Primary Examiner* — Paul Marcantoni
(74) *Attorney, Agent, or Firm* — Alan G. Towner, Esq.; Pietragallo Gordon Alfano Bosick & Raspanti, LLP (57) ABSTRACT

The present invention provides combustion products of hydrocarbon fuels and controlled amounts of metal oxide strength enhancing materials. The combustion products are useful as additives to cementitious materials. A hydrocarbon fuel such as coal is introduced into a combustion chamber and selected amounts of materials comprising CaO, $SiO_2$ and $Al_2O_3$ are also introduced into and/or downstream from the chamber. The hydrocarbon fuel undergoes combustion while the metal oxide strength enhancing materials react with each other and/or the ash or other reaction products of the hydrocarbon fuel. The combustion products have been found to significantly increase compressive strengths of cements such as Portland cement. A reduction in $SO_2$ emission levels also results from the introduction of the metal oxide strength enhancing materials into the combustion process.

29 Claims, 7 Drawing Sheets

(56) References Cited

U.S. PATENT DOCUMENTS

| | | | | |
|---|---|---|---|---|
| 4,081,285 A | * | 3/1978 | Pennell | 106/740 |
| 4,174,974 A | * | 11/1979 | Fondriest | 106/735 |
| 4,238,237 A | * | 12/1980 | Jarrett et al. | 106/757 |
| 4,260,421 A | * | 4/1981 | Brown et al. | 106/758 |
| 4,318,744 A | | 3/1982 | Dodson | |
| 4,396,432 A | * | 8/1983 | Rostoker | 106/755 |
| 4,508,573 A | * | 4/1985 | Harris | 106/752 |
| 4,600,438 A | * | 7/1986 | Harris | 106/757 |
| 5,078,593 A | * | 1/1992 | Schreiber et al. | 432/103 |
| 5,160,539 A | | 11/1992 | Cochran | |
| 5,336,317 A | * | 8/1994 | Beisswenger et al. | 106/745 |
| 5,849,075 A | * | 12/1998 | Hopkins et al. | 106/705 |
| 5,968,254 A | * | 10/1999 | Dodgen et al. | 106/705 |
| 6,038,987 A | | 3/2000 | Koshinski | |
| 6,250,235 B1 | | 6/2001 | Oehr et al. | |
| 6,395,054 B1 | | 5/2002 | Edlinger | |
| 6,468,345 B1 | * | 10/2002 | Zhu et al. | 106/705 |
| 6,749,681 B1 | * | 6/2004 | Burdis et al. | 106/744 |
| 6,764,544 B2 | * | 7/2004 | Oates et al. | 106/763 |
| 6,869,473 B2 | | 3/2005 | Comrie | |
| 7,037,368 B2 | * | 5/2006 | Hoffis | 106/697 |
| 7,141,112 B2 | | 11/2006 | Comrie | |
| 7,294,193 B2 | | 11/2007 | Comrie | |
| 7,670,139 B2 | | 3/2010 | Hance et al. | |
| 8,110,039 B2 | * | 2/2012 | Hunt | 106/696 |
| 8,133,317 B2 | * | 3/2012 | Hirao et al. | 106/705 |
| 8,206,504 B2 | * | 6/2012 | Bethani | 106/705 |
| 8,293,005 B2 | * | 10/2012 | Barbour | 106/705 |
| 2002/0017224 A1 | | 2/2002 | Horton | |
| 2003/0154887 A1 | * | 8/2003 | Oates et al. | 106/707 |
| 2003/0233962 A1 | * | 12/2003 | Dongell | 106/709 |
| 2004/0035330 A1 | * | 2/2004 | Oates et al. | 106/795 |
| 2005/0066860 A1 | * | 3/2005 | Logan et al. | 106/745 |
| 2006/0032408 A1 | | 2/2006 | Strabala | |
| 2006/0034743 A1 | | 2/2006 | Radway et al. | |
| 2007/0184394 A1 | | 8/2007 | Comrie | |
| 2007/0224109 A1 | | 9/2007 | Chaifetz et al. | |
| 2009/0151604 A1 | * | 6/2009 | Hirao et al. | 106/705 |

FOREIGN PATENT DOCUMENTS

| | | |
|---|---|---|
| JP | 8 059311 | 3/1996 |
| KR | 950 003 212 | 2/1995 |
| WO | 2008012438 | 1/2008 |
| WO | 2011103371 A2 | 8/2011 |

OTHER PUBLICATIONS

M. Tokyay, "Strength prediction of fly ash concretes by accelerated testing", Cement and Concrete Research, vol. 29, 1999, pp. 1737-1741.

M.M. Reda Taha, N.G. Shrive, "The Use of Pozzolans to Improve Bond and Bond Strength", Proceedings of the 9th Canadian Masonry Symposium, 2001.

Ishom et al., "Behaviors of Ashes in Pressurized Fluidized Bed Combustion of Coal", Reprints of Symposia—American Chemical Society, Division of Fuel, Jan. 1, 2002, pp. 811-813, vol. 47, No. 2.

\* cited by examiner

PRODUCTION OF CEMENT ADDITIVES FROM COMBUSTION PRODUCTS OF HYDROCARBON FUELS AND STRENGTH ENHANCING METAL OXIDES

CROSS-REFERENCE TO RELATED APPLICATION

This application claims the benefit of U.S. Provisional Patent Application Ser. No. 61/245,594 filed Sep. 24, 2009, which is incorporated herein by reference.

FIELD OF THE INVENTION

The present invention relates to the production of cement additives from hydrocarbon fuel combustion products, and more particularly relates to the introduction of strength enhancing metal oxides during the combustion process to produce materials that significantly increase compressive strengths when added to cement.

BACKGROUND INFORMATION

Coal combustion products, primarily bottom ash and fly ash, represent a significant percentage of waste stream materials that are placing an enormous demand on landfills and storage ponds across the United States and around the world. Under some storage conditions, coal fly ash can cause a negative impact on the environment. Accidents involving the waste disposal and storage of these materials have recently caused the United States Environmental Protection Agency to rewrite its handling procedures for the safe storage of waste ash products.

It would be beneficial to use ash in concrete and other encapsulated applications, thereby reducing potential leaching to levels that are far below applicable limits. However, a need exists to improve the properties of such concrete products, particularly their compressive strengths.

The present invention has been developed in view of the foregoing and to remedy other deficiencies of the prior art.

SUMMARY OF THE INVENTION

The present invention provides combustion products of hydrocarbon fuels and controlled amounts of metal oxide strength enhancing materials. The combustion products are useful as additives to cementitious materials. A hydrocarbon fuel such as coal is introduced into a combustion chamber and selected amounts of materials comprising calcium oxide, silicon dioxide and aluminum oxide ($CaO$, $SiO_2$ and $Al_2O_3$) are also introduced into the chamber. The hydrocarbon fuel undergoes combustion while the metal oxide strength enhancing materials react with each other and/or the ash or other reaction products of the hydrocarbon fuel. The combustion products have been found to significantly increase compressive strengths of cements such as Portland cement. A reduction in $SO_2$ emission levels also results from the introduction of the metal oxide strength enhancing materials into the combustion process.

An aspect of the present invention is to provide a cementitious material comprising cement, and a cement additive comprising a combustion product of hydrocarbon fuel and a strength enhancing material comprising controlled amounts of calcium oxide, silicon dioxide and aluminum oxide, wherein the cement additive increases 28-day compressive strength of the cementitious material above 28-day compressive strength of the cementitious material without the cement additive.

Another aspect of the present invention is to provide a cement mix comprising cement, and a cement additive comprising a combustion product of hydrocarbon fuel and at least 10 weight percent of a strength enhancing material comprising controlled amounts of calcium oxide, silicon dioxide and aluminum oxide, wherein the cement additive increases 28-day compressive strength of the cementitious material above 28-day compressive strength of the cementitious material without the cement additive.

A further aspect of the present invention is to provide a cement additive comprising a combustion product of hydrocarbon fuel and at least 8 weight percent of a strength enhancing material comprising controlled amounts of calcium oxide, silicon dioxide and aluminum oxide, wherein when the cement additive is added to cement it increases 28-day compressive strength of the cement more than 20 percent.

Another aspect of the present invention is to provide a method of making a cement additive comprising combusting a hydrocarbon fuel in the presence of at least one metal oxide strength enhancing material to form a combustion product comprising controlled amounts of calcium oxide, silicon dioxide and aluminum oxide, wherein the cement additive comprises relative weight ratios of the calcium oxide, silicon dioxide and aluminum oxide in amounts of from about 20 to about 80 weight percent $CaO$, from about 5 to about 60 weight percent $SiO_2$, and from about 5 to about 40 weight percent $Al_2O_3$.

A further aspect of the present invention is to provide a method of modifying a hydrocarbon fuel combustion product comprising introducing the hydrocarbon fuel and a strength enhancing material comprising controlled amounts of calcium oxide, silicon dioxide and aluminum oxide into a combustion chamber, heating the hydrocarbon fuel strength enhancing material in the combustion chamber to yield a combustion product, and recovering the combustion product comprising relative weight ratios of $CaO$, $SiO_2$ and $Al_2O_3$ in amounts of from about 20 to about 80 weight percent $CaO$, from about 5 to about 60 weight percent $SiO_2$, and from about 5 to about 40 weight percent $Al_2O_3$.

Another aspect of the present invention is to provide a combustion system comprising a combustion chamber for combusting a hydrocarbon fuel and a strength enhancing material, a source of the hydrocarbon fuel, a source of the strength enhancing material, at least one injector configured to deliver the hydrocarbon fuel and the strength enhancing material to the combustion chamber, and a sensor in communication with the chamber for monitoring at least one property of a combustion product of the hydrocarbon fuel and the strength enhancing material.

These and other aspects of the present invention will be more apparent from the following description.

DETAILED DESCRIPTION

Figure 1:
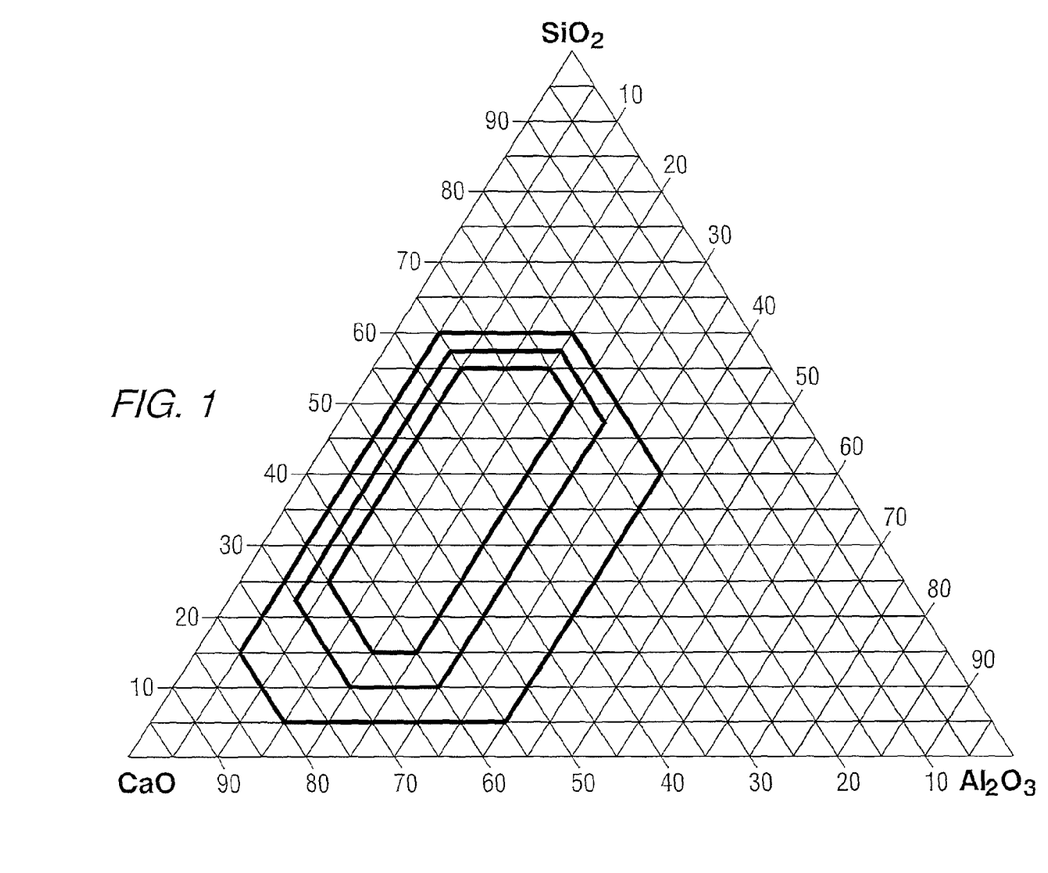
FIGS. 1-3 are ternary phase diagrams illustrating the relative amounts of $CaO$, $SiO_2$ and $Al_2O_3$ in combustion products achieved by controlling the types and amounts of metal oxide strength enhancing additives introduced during the combustion of coal in accordance with embodiments of the present invention.

In accordance with the present invention, selected types and amounts of metal oxide strength enhancing additives undergo combustion with hydrocarbon fuels to produce a useful cement additive material having controlled amounts of calcium oxide, silicon dioxide and aluminum oxide. FIG. 1 is a ternary phase diagram illustrating the relative amounts of strength enhancing metal oxides, expressed in terms of CaO, $SiO_2$ and $Al_2O_3$, that are present in combustion products in accordance with embodiments of the present invention. Table 1 below lists the typical, preferred and more preferred CaO, $SiO_2$ and $Al_2O_3$ ranges illustrated in FIG. 1. The terms "CaO", "$SiO_2$" and "$Al_2O_3$" appearing in FIG. 1 and used herein mean the relative weight percentages of calcium oxide, silica and alumina contained in the cement additive material in accordance with the ASTM C114 standard.

TABLE 1

| | Relative Weight Percentages | | |
|---|---|---|---|
| | Typical | Preferred | More Preferred |
| CaO | 20-80 | 22.5-70 | 25-65 |
| $SiO_2$ | 5-60 | 10-57.5 | 15-55 |
| $Al_2O_3$ | 5-40 | 7.5-30 | 10-25 |

Figure 2:
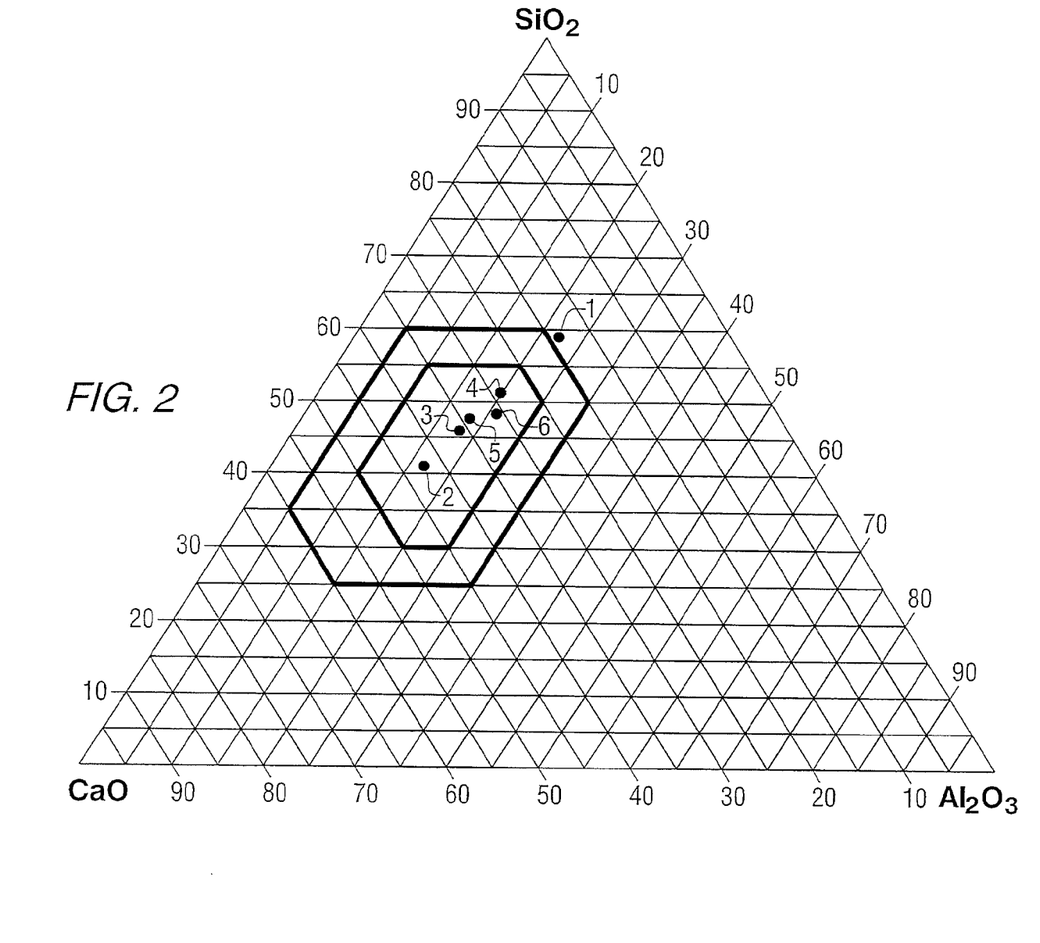

In accordance with embodiments of the present invention, the hydrocarbon fuels that undergo combustion in the presence of the metal oxide strength enhancing additives include bituminous coal and sub-bituminous coal. In one embodiment in which the hydrocarbon fuel comprises bituminous coal, the relative amounts of CaO, $SiO_2$ and $Al_2O_3$ present in the combustion product typically range from about 20 to about 60 weight percent CaO, from about 25 to about 60 weight percent $SiO_2$, and from about 5 to about 30 weight percent $Al_2O_3$. For example, the relative amounts of CaO, $SiO_2$ and $Al_2O_3$ in the bituminous coal combustion product may range from about 25 to about 50 weight percent CaO, from about 30 to about 55 weight percent $SiO_2$ and from about 10 to about 25 weight percent $Al_2O_3$. These ranges are graphically shown in the ternary diagram of FIG. 2.

Figure 3:
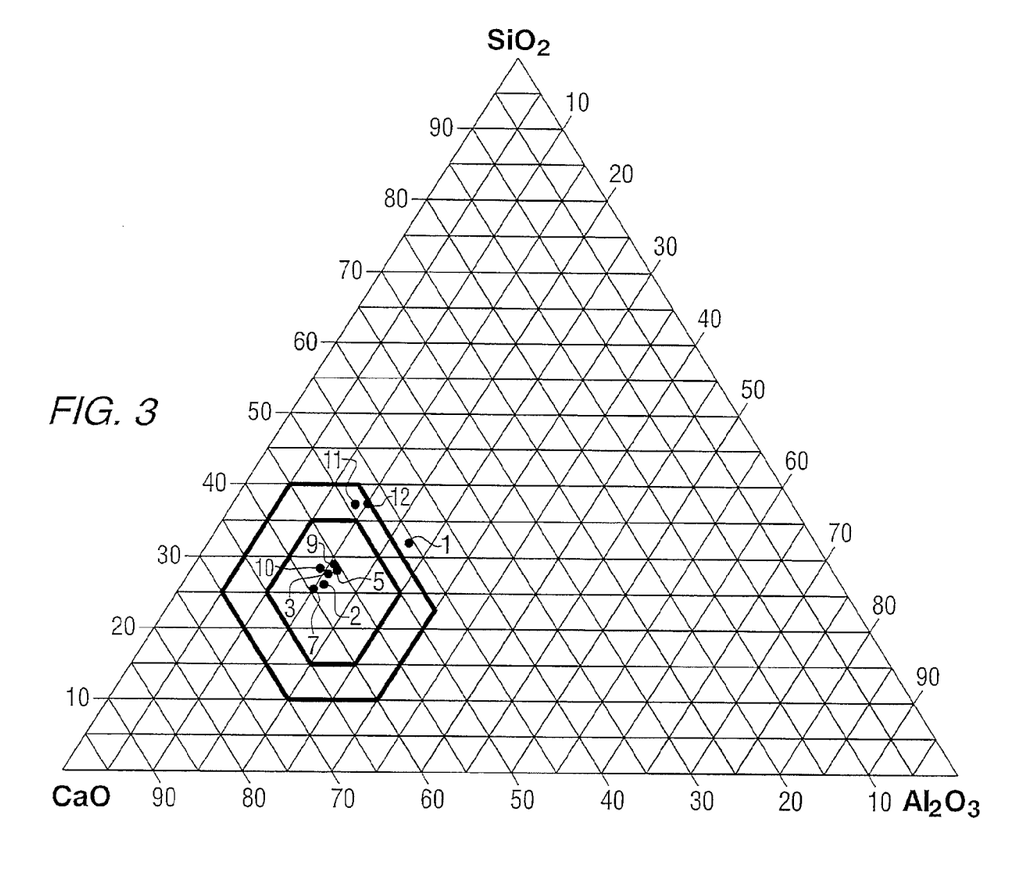

In another embodiment in which the hydrocarbon fuel comprises sub-bituminous coal, the relative amounts of CaO, $SiO_2$ and $Al_2O_3$ present in the combustion product typically comprise from about 47.5 to about 70 weight percent CaO, from about 10 to about 40 weight percent $SiO_2$, and from about 5 to about 30 weight percent $Al_2O_3$. For example, the relative amounts of CaO, $SiO_2$ and $Al_2O_3$ in the sub-bituminous coal combustion product may range from about 50 to about 65 weight percent CaO, from about 15 to about 35 weight percent $SiO_2$, and from about 10 to about 25 weight percent $Al_2O_3$. These ranges are graphically shown in the ternary diagram of FIG. 3.

The metal oxide strength enhancing materials producing the CaO, $SiO_2$ and $Al_2O_3$ levels above may be low cost minerals, including waste products containing calcium oxide, silicon dioxide and/or aluminum oxide that can be beneficiated by virtue of the temperatures in a combustion chamber such as a coal fired boiler when injected in the system at selected particle sizes, dosage and temperature levels. In one embodiment, combinations of additives are selected from limestone, waste concrete such as recycled Portland cement concrete, recycled ground granulated blast furnace slag, recycled crushed glass, recycled crushed aggregate fines, silica fume, cement kiln dust, lime kiln dust, weathered clinker, clinker, aluminum slag, copper slag, granite kiln dust, zeolites, limestone quarry dust, red mud, fine ground mine tailings, oil shale fines, bottom ash, dry stored fly ash, landfilled fly ash, ponded flyash, sopodumene lithium aluminum silicate materials, lithium-containing ores and other waste or low-cost materials containing calcium oxide, silicon dioxide and/or aluminum oxide. In accordance with certain embodiments of the present invention, the metal oxide strength enhancing materials may comprise one or more of the following materials: 7-20 weight percent limestone; 1-5 weight percent ground granulated blast furnace slag; 1-5 weight percent crushed concrete; 0.1-2 weight percent crushed glass; 0.1-5 weight percent kaolin; and 0.01-1 weight percent silica fume. The additives may be provided in desired particle size ranges and introduced into the combustion chamber in the same region as the coal, or in other regions.

The combustion products of the present invention may be added to various types of cement, including Portland cement. For example, the combustion products may comprise greater than 10 weight percent of the cementitious material, typically greater than 25 weight percent. In certain embodiments, the additive comprises 30 to 95 weight percent of the cementitious material.

One embodiment of the present invention uses the coal fired boiler of an electric power plant as a chemical processing vessel to produce the combustion products, in addition to its normal function of generating steam for electrical energy. This approach may be taken without reducing the efficiency of the boiler's output while, at the same time, producing a commodity with a controlled specification and a higher commercial value to the construction market. The resulting ash product is designed to have beneficial pozzolanic properties for use in conjunction with Portland cement, or with different chemical modifications also producing a pozzolan that could also be a direct substitution for Portland cement. In both cases, advantages may be both economic and environmental. Landfill needs are reduced, and cost savings result by avoiding transportation and land filling of the ash. In addition, to the extent that the ash replaces Portland cement, it reduces the amount of carbon dioxide and other toxic emissions generated by the manufacture of Portland cement.

Figure 4:
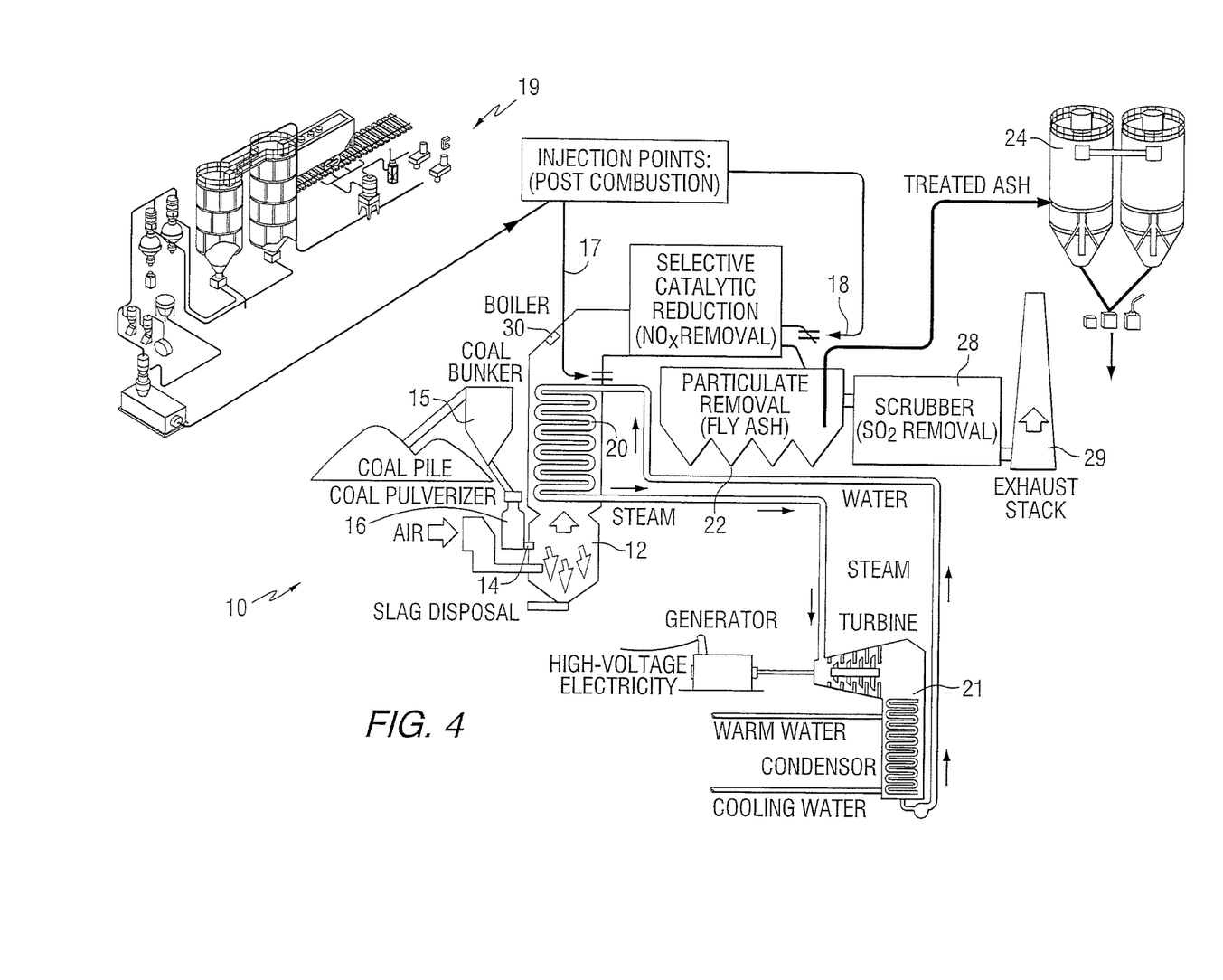
FIG. 4 is a partially schematic diagram of certain elements of a coal-fired power plant showing injection points for coal and metal oxide strength enhancing materials, and sensor locations for in-situ monitoring, in accordance with embodiments of the present invention.

FIG. 4 schematically illustrates certain elements of a coal-fired power plant 10. The power plant includes a combustion chamber 12 such as a conventional tangential firing burner configuration. Pulverized coal is introduced into the combustion chamber 12 via at least one coal inlet line 14. A coal hopper 15 feeds into a coal pulverizer 16 which comminutes the coal to the desired particle size for introduction into the combustion chamber 12. The pulverized coal may be mixed with hot air and blown through the inlet(s) 14 into the combustion chamber 12 where the coal is burned.

The metal oxide strength enhancing additives may be introduced into the combustion chamber 12 via the coal inlet line 14, or separately through one or more additional inlet lines 17 and 18. The strength enhancing additives may be stored and dispensed from an additive delivery system 19 comprising conventional particulate material storage hoppers, metering systems and delivery systems for delivering the additives to the coal inlet line 14 and/or additional inlet lines 17 and 18.

Water flows through tube-lined walls of the boiler 20, where it is heated by the combusted fuel to form steam that passes to a steam turbine 21. Combustion products pass from the boiler region to a particulate collection region 22 where the solid combustion products are collected and transferred to hoppers 24. Exhaust gas passes through a scrubber 28 and is vented through a stack 29. At least one sensor 30 may be provided in or downstream from the combustion chamber 12.

Coal fly ash is essentially formed from the combustion gases as they rise from the combustion zone and coalesce above that zone. Typically, when temperatures are in the range of 1,800-2,200° F., these gases form predominantly amorphous hollow spheres. Depending upon the chemistry of the coal being used (using coal as an example), the ash is either an alumina-silicate, from the combustion of bituminous coal, or calcium-alumina-silicate from the combustion of a sub-bituminous coal. While fly ash from sub-bituminous coal may be self-cementing, fly ash from bituminous coal may not be self-cementing.

In accordance with the present invention, chemical additives like those listed can be added directly to the boiler in such a way that an ash from coal can be enhanced by adjusting its ratios of calcium oxide, silicon dioxide and aluminum oxide for optimum ash performance. In addition, additives such as clays, including kaolin, can be added to the boiler. Such materials may not decompose and recombine with the ash, but rather may be thermally activated and intimately mixed through the highly convective flow patterns inherent in the boiler. The result is a uniform ash/additive blend achieved completely through the boiler combustion process, and requiring no secondary processing. Essentially, as the vapor from the combusted products coalesce when they rise from the high temperature zone, glassy calcia-alumina-silicates will form. Vaporized additives dispersed in the plume will become part of the glassy phase, while those that have not vaporized will act as nuclei for the coalescing vapors. Other additives that do not take part with the glassy phase formation may be intimately mixed with the ash, producing a highly reactive pozzolanic mixture. For example, kaolin introduced in the boiler may not take part in the ash formation, but may transform to metakaolin, an otherwise costly additive.

The intimate blending of the metal oxide strength enhancing materials directly into a boiler permits the combustion synthesis of the additives together with the hydrocarbon fuel and relies upon the intimate mixing generated by the convective flow in or near the boiler to produce chemically modified fly ash. This blending may take place in the main combustion zone of the boiler, directly above the main combustion zone in the boiler, or downstream from the boiler. For example, additional additives such as kaolin, metakaolin, titanium dioxide, silica fume, zeolites, diatomaceous earth, etc. may be added at such downstream locations at other points where the coal combustion products coalesce into amorphous fly-ash particles. In one embodiment, relatively low cost kaolin may be added and converted into metakaolin during the process, thereby resulting in the economical production of metakaolin having desirable strength enhancing properties when added to cement. By virtue of the materials selected as additives to the fuel, the resulting ash byproduct can be designed to have a chemical structure that will enable it to act as a cementitious binder together with Portland cement for strength enhancing properties of a cement or a concrete. The particles being injected are, in some cases, much larger than the resulting ash particles, indicating that the intense high-temperature mixing causes particle reduction/attrition both through intense collisions as well as through chemical combustion. For example, the average particle size of the combustion product may be less than 20 microns, typically less than 10 microns, while the average particle size of at least some of the starting additive materials may be greater than 50 or 100 microns.

In addition to using the intense blending nature of the boiler plume for the combustion synthesis of unique ash products, other beneficial additives can be mixed in the high temperature gas flow simply to achieve intimate mixing in a single processing step. Such additions of non-reactive materials can be accomplished without reducing the efficiency of the coal combustion process.

Another embodiment may include the injection of some of the ground air or water quenched bottom ash in the fuel bed and space directly above the combustion bed. This space may serve as an active mixing chamber. The combination of heat, air injection and coal combustion may create a mixing chamber for intimate mixing of all reactive and non-reactive particles.

In another embodiment geopolymer cements may be added in the combustion process to reduce pollutants in flue gas. Such geopolymer cements may serve as binding agents for mercury, heavy metals, nitrogen oxides and sulfur oxides, and additional silica.

It is through the injection of these additions that the resultant fly ash formed in the coal combustion process may be modified by the inclusion of the chemical compounds within these additives directly into the coalescing fly ash. In addition, some chemical species added in this manner that do not become chemically bound to the coalescing fly ash are intimately blended with the fly ash through the natural convection in the boiler resulting in a very uniform blending process achieved without the need for secondary, cost intensive, powder blending of the resultant ash product.

In accordance with an embodiment of the invention, a coal fired boiler can be used as a co-generator to produce both heat for electrical power generation as well as excess heat, combustion synthesis, and thermal blending to produce a highly reactive pozzolanic powder. A comparison of the starting materials particle size and the resulting product particle size demonstrates that a combination of combustion and comminution within the boiler takes place, rapidly reducing large oxide materials into fine powders. Moreover, the combustible additives may blend with the fume from the coal combustion to permit the formation of a chemically enhanced coal ash.

The present process does not clean waste products post-generation for industrial use, but rather avoids the production of waste materials altogether. The generated product can be made at a production cost below that of the industrial materials it is replacing. For example, every ton of product used in lieu of cement may also reduce $CO_2$ emissions by close to 0.85 tons, the equivalent emissions produced by the manufacturing of the cement that is being replaced.

In another embodiment, a method is provided for testing the resulting coal combustion ash after addition of other materials and adjusting the combustion parameters and materials to reach target levels of calcium oxide, silicon dioxide and aluminum oxide in the resulting coal combustion ash. Such testing and adjusting may include measuring contents of calcium oxide, silicon dioxide and aluminum oxide and other reactive and non-reactive elements directly. The method also may include measuring properties of concrete made from the resulting coal combustion ash so as to determine early strength, late strength, slump and setting time of the concrete made of the resulting coal combustion ash. The measurements may be coupled to algorithms to rapidly assess the data and make changes to the feed rates in real time.

The testing methods may measure components such as calcium oxide, silicon dioxide and aluminum oxide and other reactive and non-reactive elements using x-ray diffraction (XRD) methods, including Rietvield analysis, x-ray fluorescence (XRF) or any other methods to identify said components. Such methods can be used in-line or end-of-line. Methods to measure strength (early and late), set time and slump can be derived from methods provided in ASTM standards relative to the measurement of such properties, or measures of heat of hydration through calorimeters, or measures of conductivity, or ultrasonic methods, or any other method that can measure or infer any of the aforementioned properties.

In one embodiment, the incorporation of sensors in a boiler that can monitor the in-situ quality/chemistry of an ash product as it is being generated. The sensors can include conventional residual gas analyzers, x-ray fluorescence spectrometers, mass spectrometers, atomic absorption spectrometers, inductively-coupled plasma optical emission spectrometers, Fourier transform infrared spectrometers, and lasers for performing laser induced breakdown spectroscopy, as well as mercury analyzers, NO detectors and $SO_x$ detectors. The levels of gases, etc. measured by such techniques can be linked to the optimum chemistry of an ash product.

The sensors can provide real-time monitoring feedback to a human controller or an automated analysis system. For example, the sensor(s) may transmit the value of a measured property to a controller which compares the measured value to a reference value and adjusts the flow rate of the strength enhancing material based thereon. The controller may transmit a signal to one or more additive injectors in order to increase or decrease the flow rate of the additive into the combustion zone. The purpose of this feedback system is to link directly to the individual sources of chemical additives and adjust their feed rates to maintain the ash chemistry quality required for optimum concrete performance.

Using gas analysis equipment during the modified coal combustion process, it is also possible to measure the effluent gases generated by the coal combustion process. Typically, these gases include $NO_x$, $SO_x$, $CO_2$, and mercury. Through prior analysis of these gas ranges, taken together with the resulting ash reactivity, it is possible to use gas monitoring processes to optimize the addition of the chemical additives. In this way, an optimum reactive ash chemistry can be adjusted in-situ, that is in real time during the coal combustion process, to optimize the chemistry of the resulting coal ash.

The following examples are intended to illustrate various aspects of the invention, and are not intended to limit the scope of the invention.

In the following examples, pulverized bituminous or sub-bituminous coal was injected into the boiler along with the additives listed in Table 2 below. The bituminous coal was obtained from Triad Mine in Southwestern Indiana and was pulverized to an average particle size of 40 microns. The sub-bituminous coal was Eagle Butte Coal pulverized to an average particle size of 40 microns. The average particle size of each additive is listed in Table 2. In each case, the subsequent ash product was tested as an additive to Portland cement at 30 and 60 weight percent. The strengths of selected samples at 1, 7, 28 and 56 days were tested according to the standard ASTM C109 test procedure. As a baseline, for 100 percent Portland cement, the 1 day compressive strength is 3,000 psi, the 7 day compressive strength is 5,000 psi, and the 28 day compressive strength is 5,900 psi.

TABLE 2

| | Additive | Average Particle Size |
|---|---|---|
| A. | pulverized limestone | 80 microns |
| B. | ground granulated blast furnace slag (GGBFS)[1] | 8 microns |
| C. | ground recycled concrete[2] | 200 microns |
| D. | ground recycled glass | 100 microns |
| E. | kaolin[3] | 3 microns |
| F. | nano-titanium dioxide | 0.04 microns |
| G. | silica fume | 20 microns |

[1]Ground granulated blast furnace slag comprises about 40 weight percent $SiO_2$, about 39 weight percent CaO, about 13.5 weight percent $Al_2O_3$, about 3.5 weight percent MgO, and about 1.8 weight percent $Fe_2O_3$.
[2]Ground recycled concrete comprises about 68 weight percent $SiO_2$, about 9 weight percent $Al_2O_3$, about 7.5 weight percent CaO, about 4 weight percent $Fe_2O_3$, about 1.2 weight percent MnO, and about 8 weight percent moisture.
[3]During the process, the kaolin is converted to metakaolin, which comprises $Al_2Si_2O_5(OH)_4$.

Additive A was injected directly above the combustion zone at a temperature of 2,100° F. Additives B, C, D and G were pre-blended in a ribbon blender with the pulverized coal and injected into the combustion zone at temperatures of 2,300° F. (sub-bituminous) and 2,800° F. (bituminous). Additives E and F were injected at the top of the combustion chamber at a temperature of 1,900° F.

EXAMPLE 1

Bituminous coal was mixed with metal oxide strength enhancing materials of the types and amounts listed in Table 3 below. Each mixture was then introduced into the combustion zone of a tangential firing burner. The average particle size of the resultant combustion product for each sample is listed in Table 3. In each case, the average particle size of the combustion product is less than 10 microns and is significantly less than the particle sizes of the starting coal and additive materials. The relative amounts of CaO, $SiO_2$ and $Al_2O_3$ contained in each sample are also listed in Table 3 as measured in accordance with the ASTM C114 standard. The relative amounts of CaO, $SiO_2$ and $Al_2O_3$ are plotted on the ternary diagram of FIG. 2, with each sample number labeled.

TABLE 3

| | Combustion Products - Bituminous Coal | | | | | |
|---|---|---|---|---|---|---|
| | Bituminous Coal | Additive | Combustion Product Ave. Particle Size | Relative $CaO/SiO_2/Al_2O_3$ Contents (wt %) | | |
| Sample No. | (wt %) | (wt %) | (microns) | CaO | $SiO_2$ | $Al_2O_3$ |
| 1 | 92.0 | 8 limestone | 6.6 | 19.2 | 59.0 | 21.8 |
| 2 | 75.1 | 18 limestone | 5 | 42.5 | 41.3 | 16.2 |
| | | 3 GGBFS | | | | |
| | | 3 recycled concrete | | | | |
| | | 0.3 recycle glass | | | | |
| | | 0.6 kaolin[1] | | | | |

TABLE 3-continued

Combustion Products - Bituminous Coal

| Sample No. | Bituminous Coal (wt %) | Additive (wt %) | Combustion Product Ave. Particle Size (microns) | Relative CaO/SiO$_2$/Al$_2$O$_3$ Contents (wt %) | | |
|---|---|---|---|---|---|---|
| | | | | CaO | SiO$_2$ | Al$_2$O$_3$ |
| 3 | 75.1 | 18 limestone<br>3 GGBFS<br>3 recycled concrete<br>0.3 recycle glass<br>0.6 kaolin[1] | 6.7 | 34.2 | 46.8 | 19.0 |
| 4 | 81.6 | 10 limestone<br>3.6 GGBFS<br>3.6 recycled concrete<br>0.4 recycle glass<br>0.8 kaolin[1] | 7 | 29.6 | 50.6 | 19.8 |
| 5 | 80.0 | 20 limestone | — | 35.4 | 45.6 | 19.0 |
| 6 | 88.5 | 11.5 limestone | — | 30.4 | 49.4 | 20.2 |

[1]The resulting product contained metakaolin rather than kaolin.

EXAMPLE 2

Figure 5:
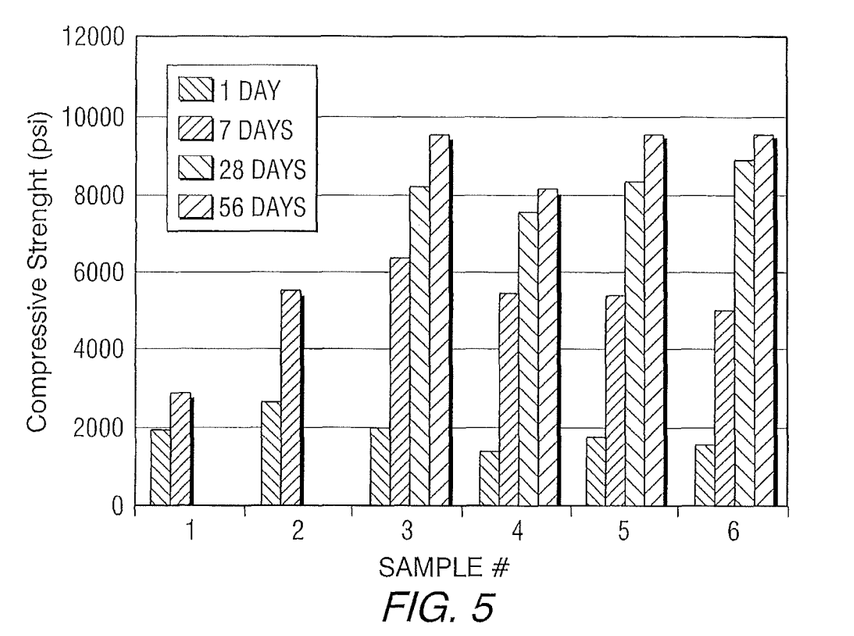
FIGS. 5-8 are charts showing compressive strengths of cementitious materials containing strength enhancing additives in accordance with embodiments of the present invention.

The combustion product samples of Example 1 were mixed with Portland cement in ratio of 30 weight percent combustion product and 70 weight percent Portland cement. Each blended mixture was combined with sand and water and tested for compressive strength development in accordance with the standard ASTM C109 test procedure at days 1, 7, 28 and 56. The measured compressive strengths are listed in Table 4 below and shown in FIG. 5.

TABLE 4

Compressive Strengths - Bituminous Coal - 30 percent Combustion Product

| Sample No. | Compressive Strengths (psi) | | | |
|---|---|---|---|---|
| | 1 day | 7 days | 28 days | 56 days |
| 1 | 1911 | 2897 | — | — |
| 2 | 2829 | 5497 | — | — |
| 3 | 1976 | 6384 | 8230 | 9608 |
| 4 | 1533 | 5493 | 7594 | 8193 |
| 5 | 1802 | 5439 | 8353 | 9594 |
| 6 | 1597 | 5059 | 8950 | 9786 |

EXAMPLE 3

Figure 6:
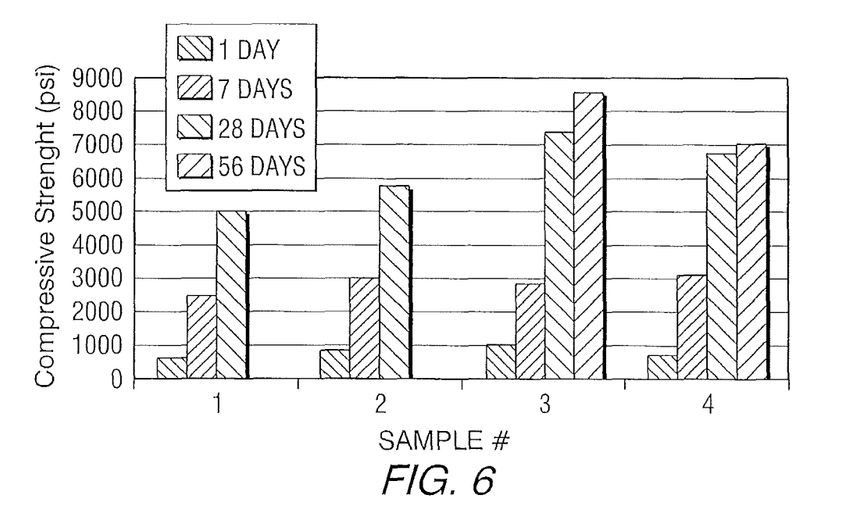

Example 2 was repeated except the combustion product was added to the Portland cement in an amount of 60 percent additive and 40 percent Portland cement. Compressive strengths of each sample are listed below in Table 5, and shown in FIG. 6.

TABLE 5

Compressive Strengths - Bituminous Coal - 60 percent Combustion Product

| Sample No. | Compressive Strengths (psi) | | | |
|---|---|---|---|---|
| | 1 day | 7 days | 28 days | 56 days |
| 1 | 624 | 2475 | 5014 | — |
| 2 | 863 | 3059 | 5773 | — |
| 3 | 988 | 2842 | 7361 | 8567 |
| 4 | 717 | 3074 | 6755 | 7058 |

EXAMPLE 4

Sub-bituminous coal was mixed with strength-enhancing additives of the types and amounts listed in Table 6 below. Each mixture was then introduced into the combustion zone of a tangentially firing burner. The average particle size of the resultant combustion product for each sample is listed in Table 6. In each case, the average particle size of the combustion product is less than 10 microns and is significantly less than the particle sizes of the starting coal and additive materials. The relative amounts of CaO, SiO$_2$ and Al$_2$O$_3$ contained in most of the samples are also listed in Table 3, and plotted in FIG. 3, as measured in accordance with the ASTM C114 standard.

TABLE 6

Combustion Products - Sub-Bituminous Coal

| Sample No. | Sub-Bituminous Coal (wt %) | Additive (wt %) | Combustion Product Ave. Particle Size (microns) | Relative CaO/SiO$_2$/Al$_2$O$_3$ Contents (wt %) | | |
|---|---|---|---|---|---|---|
| | | | | CaO | SiO$_2$ | Al$_2$O$_3$ |
| 1 | 96.2 | 3.8 limestone | 6 | 45.5 | 32.5 | 22.0 |
| 2 | 92.5 | 7.5 limestone | 7 | 57.2 | 26.0 | 16.8 |
| 3 | 90.8 | 7.4 limestone<br>1.8 GGBFS | 6 | 56.3 | 27.5 | 16.2 |
| 4 | 89.1 | 7.4 limestone<br>3.5 GGBFS | 6 | — | — | — |

TABLE 6-continued

Combustion Products - Sub-Bituminous Coal

| Sample No. | Sub-Bituminous Coal (wt %) | Additive (wt %) | Combustion Product Ave. Particle Size (microns) | Relative CaO/SiO$_2$/Al$_2$O$_3$ Contents (wt %) | | |
|---|---|---|---|---|---|---|
| | | | | CaO | SiO$_2$ | Al$_2$O$_3$ |
| 5 | 90.8 | 7.4 limestone<br>1.8 recycled concrete | 7 | 55.7 | 27.9 | 16.4 |
| 6 | 89.1 | 7.4 limestone<br>3.5 recycled concrete | 6 | — | — | — |
| 7 | 90.8 | 7.4 limestone<br>1.8 recycled glass | 7 | 59.0 | 25.6 | 15.4 |
| 8 | 89.1 | 7.4 limestone<br>1.75 GGBFS<br>1.75 recycled concrete | 6 | — | — | — |
| 9 | 88.3 | 7.2 limestone<br>1.7 GGBFS<br>1.7 recycled concrete<br>0.9 kaolin[1] | 6 | 55.7 | 29.1 | 15.2 |
| 10 | 88.3 | 7.2 limestone<br>1.7 GGBFS<br>1.7 recycled concrete<br>0.9 kaolin[1]<br>$1 \times 10^{-4}$ grams nano TiO$_2$ | 6 | 56.8 | 28.4 | 14.8 |
| 11 | 88.1 | 7.2 limestone<br>1.7 GGBFS<br>1.7 recycled concrete<br>0.8 kaolin[1]<br>0.1 silica fume | 7 | 48.2 | 37.4 | 14.4 |
| 12 | 88.1 | 7.2 limestone<br>1.7 GGBFS<br>1.7 recycled concrete<br>0.8 kaolin[1]<br>$1 \times 10^{-4}$ grams nano TiO$_2$<br>0.1 silica fume | 6 | 47.5 | 37.5 | 15.0 |

[1]The resulting product contained metakaolin rather than kaolin.

EXAMPLE 5

Figure 7:
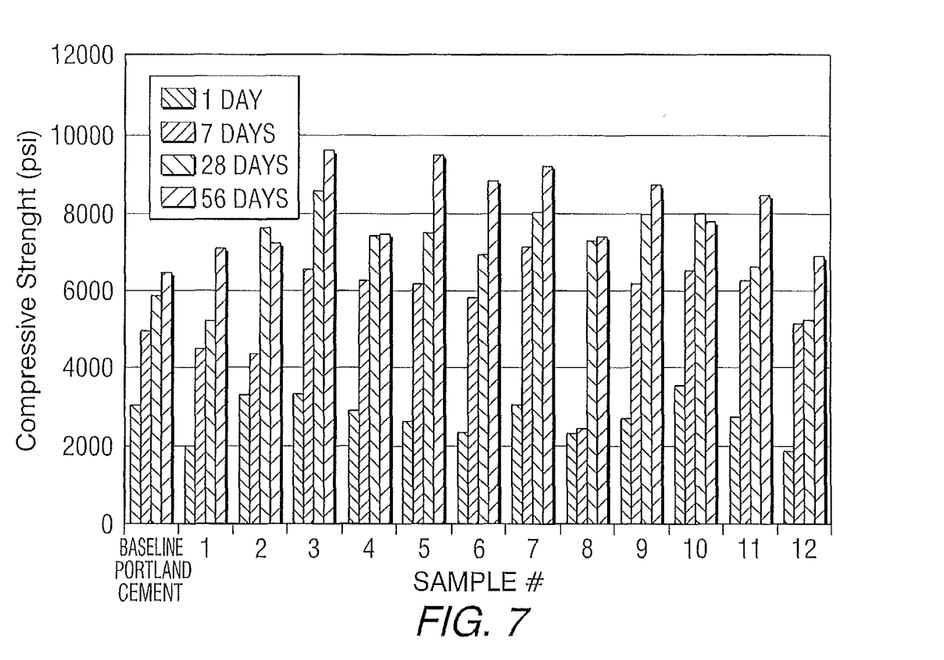

The combustion product samples of Example 4 were mixed with Portland cement in ratio of 30 weight percent combustion product and 70 weight percent Portland. Each blended mixture was combined with sand and water and tested for compressive strength testing in accordance with the standard ASTM C109 test procedure at days 1, 7, 28 and 56. The measured compressive strengths are listed in Table 7 below and shown in FIG. 7. The compressive strengths of Sample No. 1 corresponding to the combustion product derived from relatively low calcium oxide additions are significantly less than the other samples derived from significantly higher amounts of various additions. Also, for comparative purposes, a 100 percent Portland cement sample was also prepared, with the compressive strengths listed in Table 7 and shown in FIG. 7.

TABLE 7

Compressive Strengths - Sub-Bituminous Coal - 30 percent Combustion Product

| Sample No. | Compressive Strengths (psi) | | | |
|---|---|---|---|---|
| | 1 day | 7 days | 28 days | 56 days |
| Baseline Portland Cement | 3046 | 4984 | 5877 | 6450 |
| 1 | 2015 | 4547 | 5231 | 7086 |
| 2 | 3330 | 4274 | 7619 | 7222 |
| 3 | 3312 | 6674 | 8580 | 9603 |
| 4 | 2882 | 6231 | 7428 | 7480 |
| 5 | 2613 | 6145 | 7496 | 9511 |
| 6 | 2321 | 5838 | 6942 | 8832 |
| 7 | 3026 | 7151 | 8046 | 9225 |
| 8 | 2303 | 2420 | 7267 | 7391 |
| 9 | 2684 | 6126 | 7974 | 8754 |
| 10 | 3529 | 6600 | 7997 | 7798 |
| 11 | 2721 | 6276 | 6645 | 8464 |
| 12 | 1847 | 5182 | 5230 | 6926 |

EXAMPLE 6

Figure 8:
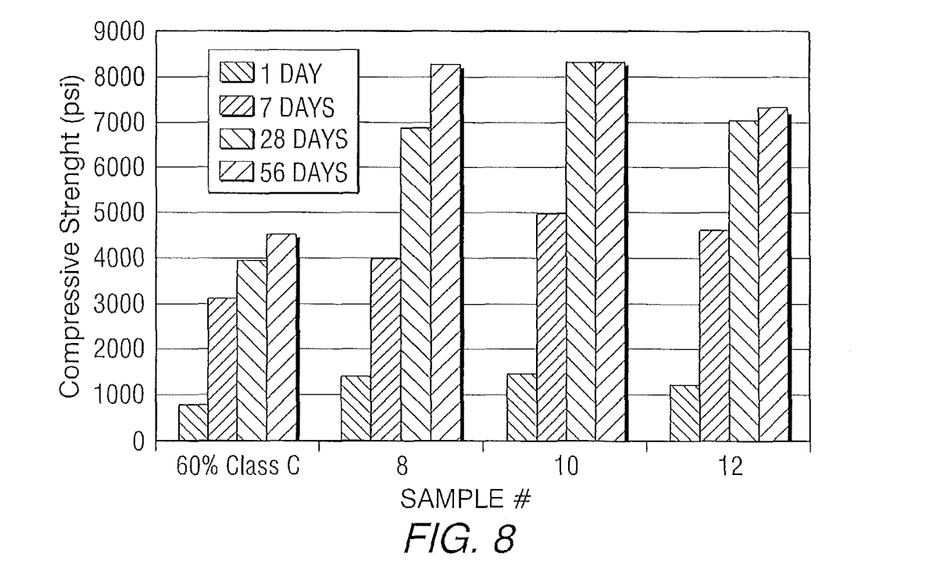

Example 5 was repeated except the combustion product was added to the Portland cement in an amount of 60 percent additive and 40 percent Portland cement. Compressive strengths of each sample are listed below in Table 8, and shown in FIG. 8.

TABLE 8

Compressive Strengths - Sub-Bituminous
Coal - 60 percent Combustion Product

| Sample No. | Compressive Strengths (psi) | | | |
|---|---|---|---|---|
| | 1 day | 7 days | 28 days | 56 days |
| 60% class C fly ash | 809 | 3129 | 3953 | 4530 |
| 8 | 1408 | 4014 | 6868 | 8263 |
| 10 | 1480 | 4985 | 8322 | 8325 |
| 12 | 1249 | 4601 | 7036 | 7343 |

In accordance with the present invention, compressive strengths of cement materials containing the present combustion product additive materials are significantly increased above the compressive strengths of similar cement materials without the additives. For example, 28-day compressive strengths may be increased by at least 20 or 30 percent, typically by at least 30 or 40 percent, or more.

EXAMPLE 7

Figure 9:
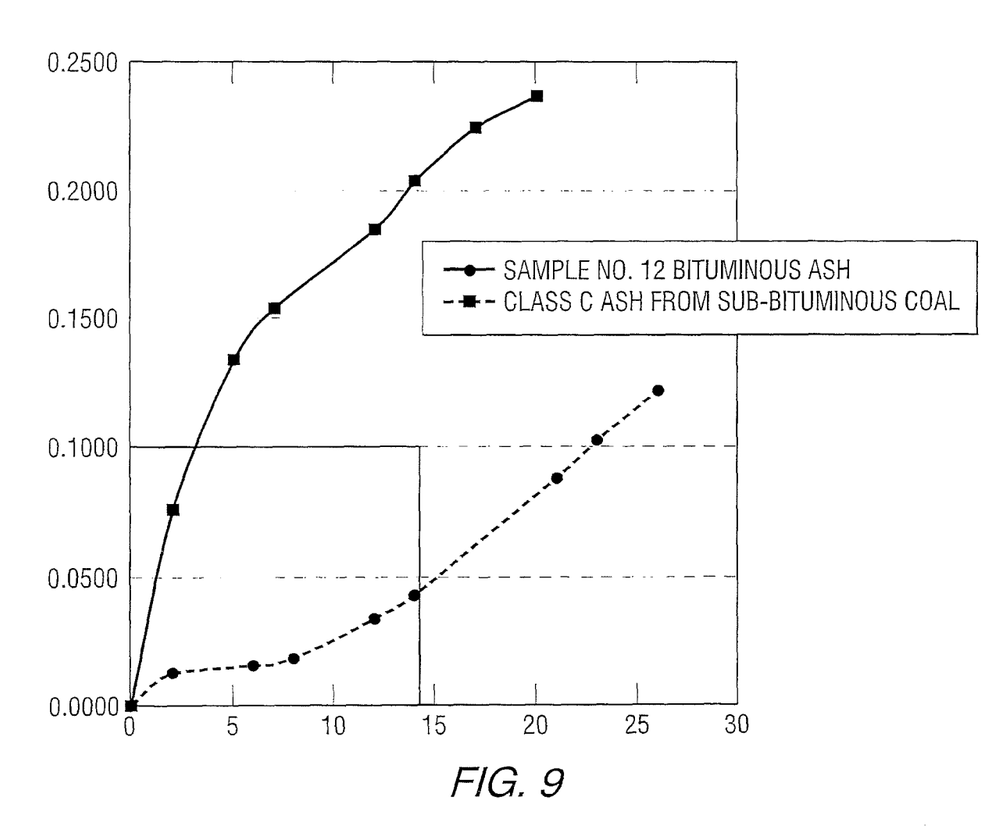
FIG. 9 is a graph showing the results of alkali-silica reaction testing of a combustion product in accordance with an embodiment of the present invention.

A comparison was made between a combustion product of bituminous coal and additives (Sample No. 12 in Table 3 above) and standard class C flyash obtained from the combustion of sub-bituminous coal to determine alkali-silica resistance in concrete mixtures. The data in FIG. 9 shows the results of alkali-silica reaction testing in accordance with the ASTM C1260 standard using the two different coal ash types. The box located in the lower left corner of the graph indicates the zone where concrete mixtures containing the cement material should remain in order to be considered alkali-silica resistant for at least 14 days. The top curve is the alkali-silica reaction of a class C ash produced as a standard combustion by-product from sub-bituminous coal. The lower curve, showing data that would pass the criteria for an alkali-silica material, corresponds to Sample No. 12 comprising the reaction products of bituminous coal and additives containing calcium oxide, silicon dioxide and alumina in accordance with an embodiment of the present invention. The cementitious binder of the present invention exceeds the ASTM standards for class C ash obtained from a sub-bituminous coal, and also provides enhanced alkali-silica resistance in compliance with ASTM standards and enhanced strengths compared to the class C ash obtained from a sub-bituminous coal.

The above-noted results confirm enhanced compressive strengths gain out to 28 days and beyond, as well as accelerated set times. The level of reactivity of the additive materials also enabled much higher substitution rates than normally feasible with untreated fly ash. At 60 percent substitution levels, early strength proved to be adequate and late strength outstanding. It is also important to note that these enhancements were accomplished without causing a loss in efficiency to the boiler, a reduced operating temperature or any slagging. Effluent control was equally unaffected, maintaining $SO_x$, $NO_x$ and mercury removal levels within an acceptable range, and with a clearly beneficial and synergistic impact on $SO_x$ removal, as discussed below.

In addition to the above-noted testing, tests were conducted to measure $SO_x$, $NO_x$ and mercury levels to ensure that the addition of the metal oxide strength enhancing materials would not induce a negative effect on removal of these contaminants, thereby increasing the normal operating cost of the boiler. Introduction of the additional materials was determined to have little to no effect on mercury removal and $NO_x$ control, while $SO_x$ removal was improved. The latter was due partly to the addition of limestone as one of the raw materials used in the process, but even higher $SO_x$ removal rates were achieved as other materials were added beyond limestone, most notably with the addition of kaolin and silica fume.

Whereas particular embodiments of this invention have been described above for purposes of illustration, it will be evident to those skilled in the art that numerous variations of the details of the present invention may be made without departing from the invention as defined in the appended claims.

The invention claimed is:

1. A cementitious material comprising:
    cement; and
    a pozzolanic cement additive comprising coal combusted in the presence of at least 8 weight percent of a strength enhancing material comprising combinations of limestone, clay, kaolin, waste concrete, recycled ground granulated blast furnace slag, recycled crushed glass, recycled crushed aggregate fines, silica fume, cement kiln dust, lime kiln dust, weathered clinker, clinker, aluminum slag, copper slag, granite kiln dust, zeolites, limestone quarry dust, red mud, mine tailings, oil shale fines, bottom ash, dry stored fly ash, landfilled fly ash, ponded flyash, sopodumene lithium aluminum silicate materials, and lithium-containing ores, wherein the cement additive comprises weight ratios of from about 20 to about 80 weight percent CaO, from about 5 to about 60 weight percent $SiO_2$, and from 7.5 to about 40 weight percent $Al_2O_3$ based on the combined total weight of the CaO, $SiO_2$ and $Al_2O_3$.

2. The cementitious material of claim 1, wherein the cement additive comprises weight ratios of from about 22.5 to about 70 weight percent CaO, from about 10 to about 57.5 weight percent $SiO_2$, and from 7.5 to about 30 weight percent $Al_2O_3$.

3. The cementitious material of claim 1, wherein the cement additive comprises weight ratios of from about 25 to about 65 weight percent CaO, from about 15 to about 55 weight percent $SiO_2$, and from about 10 to about 25 weight percent $Al_2O_3$.

4. The cementitious material of claim 1, wherein the strength enhancing material is combusted with the coal in an amount of at least 10 weight percent of the total combined weight of the strength enhancing material and the coal.

5. The cementitious material of claim 1, wherein the strength enhancing material comprises at least two materials selected from the group consisting of limestone, blast furnace slag, concrete, glass and kaolin.

6. The cementitious material of claim 1, wherein the coal comprises bituminous coal and the strength enhancing material comprises kaolin.

7. The cementitious material of claim 6, wherein the combustion product comprises metakaolin.

8. The cementitious material of claim 1, wherein the strength enhancing material comprises from about 7 to about 20 weight percent limestone based on the total combined weight of the strength enhancing material and the coal.

9. The cementitious material of claim 1, wherein the strength enhancing material comprises from about 1 to about 5 weight percent ground granulated blast furnace slag based on the total combined weight of the strength enhancing material and the coal.

10. The cementitious material of claim 1, wherein the strength enhancing material comprises from about 1 to about 5 weight percent crushed concrete based on the total combined weight of the strength enhancing material and the coal.

11. The cementitious material of claim 1, wherein the strength enhancing material comprises from about 0.1 to about 2 weight percent crushed glass based on the total combined weight of the strength enhancing material and the coal.

12. The cementitious material of claim 1, wherein the strength enhancing material comprises from about 0.1 to about 5 weight percent kaolin based on the total combined weight of the strength enhancing material and the coal.

13. The cementitious material of claim 1, wherein the strength enhancing material comprises from about 0.01 to about 1 weight percent silica fume based on the total combined weight of the strength enhancing material and the coal.

14. The cementitious material of claim 1, wherein the coal comprises bituminous coal.

15. The cementitious material of claim 1, wherein the coal comprises sub-bituminous coal.

16. The cementitious material of claim 1, wherein the combustion product has an average particle size of less than 20 microns.

17. The cementitious material of claim 1, wherein the combustion product has an average particle size of from about 1 to about 10 microns.

18. The cementitious material of claim 1, wherein the cement additive comprises greater than 25 weight percent of the cementitious material.

19. The cementitious material of claim 1, wherein the cement additive comprises from about 30 to about 95 weight percent of the cementitious material.

20. The cementitious material of claim 1, wherein the cement comprises Portland cement.

21. The cementitious material of claim 1, wherein the cement additive increases the 28-day compressive strength of the cementitious material more than 20 percent above the 28-day compressive strength of the cement without the cement additive.

22. The cementitious material of claim 1, wherein the 28-day compressive strength of the cementitious material is at least 8,000 psi.

23. The cementitious material of claim 1, wherein the 28-day compressive strength of the cementitious material is at least 9,000 psi.

24. A cement mix comprising:
cement; and
a pozzolanic cement additive comprising coal combusted in the presence of at least 10 weight percent of a strength enhancing material comprising combinations of limestone, clay, kaolin, waste concrete, recycled ground granulated blast furnace slag, recycled crushed glass, recycled crushed aggregate fines, silica fume, cement kiln dust, lime kiln dust, weathered clinker, clinker, aluminum slag, copper slag, granite kiln dust, zeolites, limestone quarry dust, red mud, mine tailings, oil shale fines, bottom ash, dry stored fly ash, landfilled fly ash, ponded flyash, sopodumene lithium aluminum silicate materials, and lithium-containing ores, wherein the cement additive comprises weight ratios of from about 20 to about 80 weight percent CaO, from about 5 to about 60 weight percent $SiO_2$, and from 7.5 to about 40 weight percent $Al_2O_3$ based on the combined total weight of the CaO, $SiO_2$ and $Al_2O_3$.

25. The cement mix of claim 24, wherein the cement additive comprises greater than 25 weight percent of the cement mix.

26. The cement mix of claim 24, wherein the cement additive comprises from about 30 to about 95 weight percent of the cement mix.

27. The cement mix of claim 24, wherein the cement comprises Portland cement.

28. The cementitious material of claim 1, wherein the $Al_2O_3$ is present in an amount of from 10 to 40 weight percent.

29. The cement mix of claim 24, wherein the $Al_2O_3$ is present in an amount of from 10 to 40 weight percent.

* * * * *